(12) United States Patent
Wilenski et al.

(10) Patent No.: US 10,974,841 B2
(45) Date of Patent: Apr. 13, 2021

(54) KINETIC ENERGY ABSORPTION METHOD AND KINETIC ENERGY ABSORPTIVE, REINFORCED, COMPOSITE ARTICLE

(71) Applicant: The Boeing Company, Chicago, IL (US)

(72) Inventors: Mark S. Wilenski, Mercer Island, WA (US); Michael P. Kozar, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 217 days.

(21) Appl. No.: 15/904,958

(22) Filed: Feb. 26, 2018

(65) Prior Publication Data
US 2019/0263532 A1    Aug. 29, 2019

(51) Int. Cl.
| | |
|---|---|
| *B32B 7/04* | (2019.01) |
| *B32B 5/14* | (2006.01) |
| *B64D 37/06* | (2006.01) |
| *B64D 37/32* | (2006.01) |
| *B64G 1/40* | (2006.01) |
| *B32B 7/05* | (2019.01) |
| *B29C 70/88* | (2006.01) |

(52) U.S. Cl.
CPC ............ *B64D 37/06* (2013.01); *B29C 70/887* (2013.01); *B32B 5/142* (2013.01); *B32B 7/05* (2019.01); *B64D 37/32* (2013.01); *B64G 1/402* (2013.01); *B29K 2995/0089* (2013.01); *B32B 2307/56* (2013.01); *B32B 2605/18* (2013.01); *B64D 2037/325* (2013.01)

(58) Field of Classification Search
CPC ............ B32B 2307/56; B32B 2307/32; B32B 2605/18; B32B 5/142; B32B 7/05; B29C 70/887; B29K 2995/0089; B64D 2037/325; B64D 37/06; B64D 37/32; B64G 1/402

See application file for complete search history.

(56) References Cited

U.S. PATENT DOCUMENTS

| | | | |
|---|---|---|---|
| 3,958,055 A | | 5/1976 | Hadley et al. |
| 8,647,072 B2 * | | 2/2014 | McMillan ............ B29C 66/004 415/9 |

(Continued)

OTHER PUBLICATIONS

European Patent Office; Extended European Search Report; European Patent Application No. 18210688.0; dated Jul. 17, 2019.

*Primary Examiner* — Yan Lan
(74) *Attorney, Agent, or Firm* — Parsons Behle & Latimer

(57) ABSTRACT

A reinforced composite article includes a first ply, a second ply, and a third ply. A first interface material is between the first ply and the second ply. A second interface material is between the second ply and the third ply. A designated pattern of material property variation, geometric structure variation, spatial variation, or combinations thereof is distributed to selected locations identified in the first interface material or distributed between selected locations identified in the first interface material compared to the second interface material. The pattern is sufficient to measurably vary adhesion, toughness, strength, modulus, or combinations thereof. The article allows distribution of a load across the pattern when the first, second, and third plies receive a force from kinetic energy above a separation threshold by partially delaminating the first ply from the second ply, the second ply from the third ply, or both.

20 Claims, 5 Drawing Sheets

(56) References Cited

U.S. PATENT DOCUMENTS

| | | |
|---|---|---|
| 9,597,859 B2 | 3/2017 | Childress et al. |
| 9,809,109 B2 | 11/2017 | Kozar et al. |
| 9,857,148 B2 | 1/2018 | Wilenski et al. |
| 2012/0156452 A1* | 6/2012 | Wilenski .................. B32B 5/14 428/212 |
| 2017/0057341 A1 | 3/2017 | Wilenski et al. |
| 2017/0057344 A1 | 3/2017 | Kozar et al. |
| 2017/0057345 A1 | 3/2017 | Wilenski et al. |
| 2017/0129207 A1 | 5/2017 | Hallander et al. |

* cited by examiner

KINETIC ENERGY ABSORPTION METHOD AND KINETIC ENERGY ABSORPTIVE, REINFORCED, COMPOSITE ARTICLE

BACKGROUND

Aircraft, spacecraft, and other structures may be impacted by various foreign objects. Examples include debris (such as tire treads, rocks, etc.), hail, micrometeoroids, etc. Breach of the structure could significantly damage internal components and effect structural integrity, even resulting in catastrophic loss of aircraft, spacecraft and other vehicular structures.

Aircraft, spacecraft, and other vehicular structures that carry fuel may experience a breach of fuel containment during a ground impact. A variety of self-sealing fuel bladders and impact containment structures exist with the goal of resisting breach of fuel containment during such events. Known fuel bladders and containment structures designed with such goals in mind are often made of either fabrics or unidirectional fibers. However, a desire exists to reduce the mass of fuel bladders and containment structures while still providing the same breach resistance or increasing breach resistance.

Accordingly, it will be appreciated that more efficient materials to reduce breach of structures would be beneficial for aircraft, spacecraft, and other vehicular structures subject to impact by foreign objects. More efficient materials exhibit a higher specific strength (strength/density), sometimes referred to as the strength-to-weight ratio. Similarly, more efficient breach resistant fuel bladders and containment structures would be beneficial. Materials with higher efficiency maintain or increase resistance to breach with less mass of the structural material compared to known structural materials.

SUMMARY

A kinetic energy absorption method includes providing a reinforced composite article including a first ply, a second ply other than the first ply, and a third ply other than the first and second plies. A first interface material is between the first ply and the second ply. A second interface material is between the second ply and the third ply. A designated pattern of material property variation, geometric structure variation, spatial variation, or combinations thereof is distributed to selected locations identified in the first interface material or distributed between selected locations identified in the first interface material compared to the second interface material. The pattern is sufficient to measurably vary adhesion, toughness, strength, modulus, or combinations thereof. A matrix material at least partially encapsulates the first, second, and third plies. The method additionally includes distributing a load across the pattern when the first, second, and third plies receive a force from kinetic energy above a separation threshold by partially delaminating the first ply from the second ply, the second ply from the third ply, or both.

A kinetic energy absorptive, reinforced, composite article contains a first ply, a second ply other than the first ply, and a third ply other than the first and second plies. A first interface material is between the first ply and the second ply. A second interface material is between the second ply and the third ply. The article includes a designated pattern of material property variation, geometric structure variation, spatial variation, or combinations thereof distributed to selected locations identified in the first interface material or distributed between selected locations identified in the first interface material compared to the second interface material. The pattern is sufficient to measurably vary adhesion, toughness, strength, modulus, or combinations thereof. A matrix material at least partially encapsulates the first, second, and third plies.

Another kinetic energy absorptive, reinforced, composite article includes an interior ply, a first backside ply other than the interior ply, and a second backside ply other than the interior ply and the first backside ply. A release material is between and in contact with the interior ply and the first backside ply. A shearing material is between and in contact with the first backside ply and the second backside ply. The article includes a designated first pattern of material property variation, geometric structure variation, spatial variation, or combinations thereof distributed to selected locations identified in the release material. The first pattern is sufficient to measurably vary adhesion, toughness, strength, modulus, or combinations thereof. The article includes a designated second pattern of material property variation, geometric structure variation, spatial variation, or combinations thereof distributed to selected locations identified in the shearing material. The second pattern is sufficient to measurably vary adhesion, toughness, strength, modulus, or combinations thereof to a different degree than the first pattern. A matrix material at least partially encapsulates the interior ply, the first backside ply, and the second backside ply.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments are described below with reference to the following accompanying drawings.

DETAILED DESCRIPTION

Figure 1A:
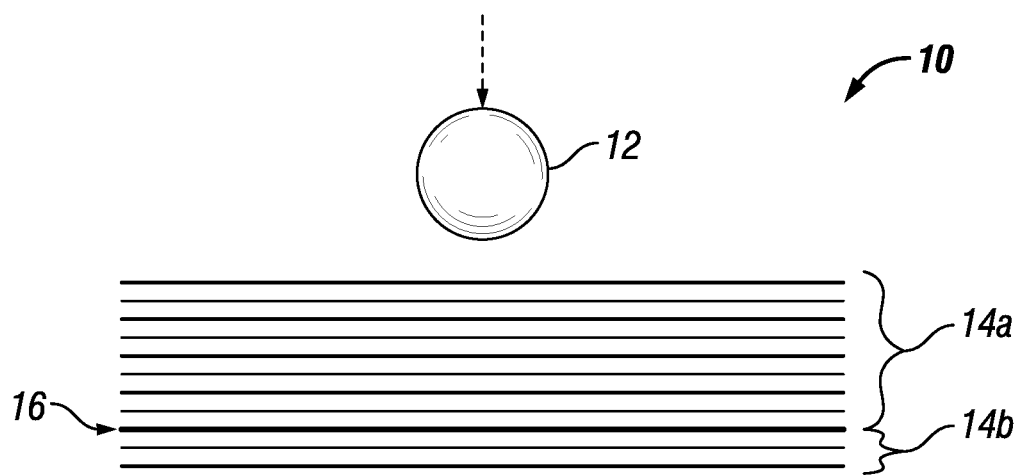
FIGS. 1A, 1B, and 1C show sequential, cross-sectional side views of an object impacting a reinforced composite and stopping in a backside catch layer.

To efficiently stop high speed objects, aerospace structures often use different mechanisms at different stages of the event. One type of efficient, lightweight structure to stop objects is made of layers of polymer fibers. Examples of known fibers that may be used in the methods and apparatuses herein include nylon, polyethylene, aramid (e.g. KEVLAR), POM (polyoxymethylene, e.g. DELRIN), PTFE (polytetrafluoroethylene, e.g. TEFLON); PEEK (polyetheretherketone), polyesters (such as, PET (polyethylene terephthalate) and others), PP (polypropylene), and PVA (polyvinyl alcohol). Others are known as well. Layers of films may instead or also be used in the methods and apparatuses herein. Examples of known thermoplastic films that may be used include acrylics, nylons, fluorocarbons, polyamides, polyethylenes, polyesters, polypropylenes, polycarbonates, polyurethanes, polyetheretherketone, polyetherketoneketone, polyetherimides, stretched polymers, and any other suitable thermoplastic material. Others are known as well.

The kinetic energy of the object can be absorbed through failure of the fibers, shearing between the layers (delaminations), damage to the object itself, and release of some number of layers to "catch" the object. The methods and apparatuses herein use specific patterns of adhesives, coupling agents, releasing agents, and other materials to cause these mechanisms to occur in the most efficient locations and to the proper extent. The patterns may be placed between layers (in-plane) or can be variations layer-to-layer (through-thickness). In-plane and through-thickness variations may be used at the same time.

While known structures might stop objects as a result of one or more of the mechanisms described above, the location and extent of those mechanisms is not specifically designed into the structure, resulting in a structure that weighs more than necessary. The mechanisms might not be invoked at the most efficient location or time during the event and, thus, not absorb energy in the most efficient manner. Known containment structures are often made with composites containing a single type of composite material in a simple cross-plied or quasi-isotropic layup.

While known layups might stop an object through the noted mechanisms, the extent and location of the different mechanisms is not controlled. Methods and apparatuses herein provide a way to control the location and extent of different defeat mechanisms, which yields a more efficient containment structure. By controlling the location and extent of different defeat mechanisms, a lighter containment structure can result. Lighter weight containment structures offer high value to rotorcraft, fixed-wing aircraft, and spacecraft, as well as for many aerospace vehicles.

In a composite with multiple plies, selectively adhering the layers in a number of ways includes adhering some layers but not others, adhering only a portion of a layer, and adhering only portions of multiple layers lying generally in the same through-thickness region of each layer. The varied adhesion layers, when impacted by an object, disperse kinetic energy among multiple layers in an increased in-plane area and through-thickness region as the layers delaminate. The increased width and increased depth of delaminated composite material creates an increased "catch" volume. Additionally, a backside layer with a higher adhesion layer between plies of the backside layer catches the object and is less likely to be breached since the "catch" volume disperses kinetic energy with its increased width and depth. In other words, absorbing kinetic energy occurs by directing the delamination along predictable paths.

Figure 6:
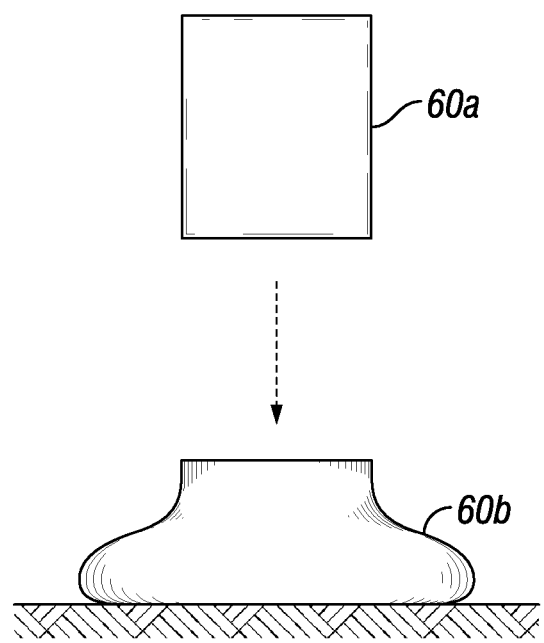
FIG. 6 shows a side view of a fuel bladder and its impact with the ground.

During a ground impact event, liquid fuel in a fuel bladder produces a hydrodynamic ram that may cause fibers to undergo very sharp impulse loading, potentially causing failure of the bladder wall. Known bladders have been very robustly designed to overcome a failure, but robustly designed bladder walls are heavy. FIG. 6 shows a fuel bladder 60a falling to the ground and distorting on impact to yield an impacted fuel bladder 60b. Distortion of the walls in impacted fuel bladder 60b shows one example of the impulse loading that fibers undergo from the hydrodynamic ram caused by contained fuel. Impact containment structures surrounding fuel bladders may be provided and similarly designed very robustly to meet performance criteria for an impact.

A robust design might include very tough materials, such as KEVLAR or other synthetic fibers, and also may be heavy in keeping with the robust design. The methods and apparatuses described herein allow load distribution and ply delamination as a mechanism for absorbing the kinetic energy applied by an impulse due to a ground impact. As such, the peak load on individual fibers may be reduced, allowing structure walls to be more efficiently designed and resulting in a lighter structure while maintaining performance.

Behavior of a composite article may be described in three general categories. First, impact of an object results in no plastic deformation with loads absorbed through the strength and resilience of the structures. Second, object impact produces plastic deformation, but not breach of the structure. Third, object impact produces both plastic deformation and breach. The methods and apparatuses herein apply to the latter two categories.

Significant explanation exists herein regarding avoiding breach by distributing loads applied from the kinetic energy of an impacting object. However, even though loads are distributed according to the methods and apparatuses herein, the possibility exists for breach when the distributed load nonetheless exceeds the strength of the materials.

Figure 1B:
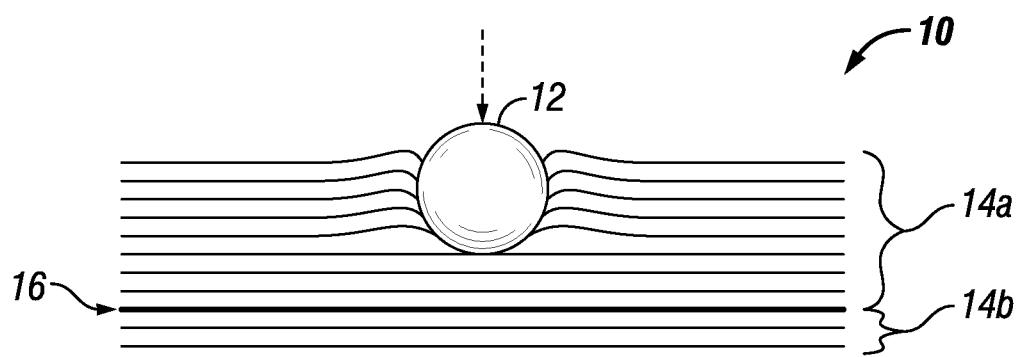
Figure 1C:
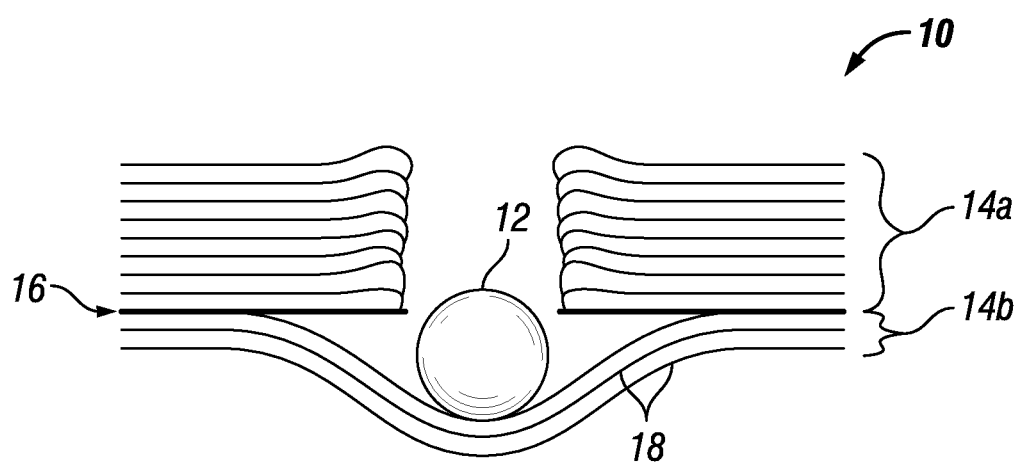

Consequently, FIGS. 1A, 1B, and 1C explain a measure that may be used alone or in conjunction with the other methods and apparatuses described herein. In FIG. 1A, a composite 10 includes layers 14a/14b, which may be individual plies or groups of plies, about to be impacted by object 12. Composite 10 includes frontside layers 14a separated from backside layers 14b by a region of reduced adhesion 16. Frontside layers 14a are outer layers of a structure and would be impacted before backside layers 14b. FIG. 1B shows object 12 impacting frontside layers 14a and traveling through them. In FIG. 1B, the methods and apparatuses described herein for distributing the load from the force of kinetic energy from object 12 may be utilized. For example, layers 14a, 14b, or both may include designated patterns sufficient to measurably vary adhesion, toughness, strength, modulus, or combinations thereof.

In the event that the load distribution from one of the methods or apparatuses herein is not implemented or is insufficient to stop object 12, FIG. 1C shows backside layers 14b becoming catching layers 18 as they delaminate and release from contact with frontside layers 14a. By controlling the release properties in reduced adhesion 16, backside layers 14b may be released, enabling various energy absorption mechanisms.

For example, shearing of reduced adhesion 16 absorbs kinetic energy. Also, the shear performance between backside layers 14b as they become catching layers 18 can be controlled to allow shearing between such layers. The shearing between catching layers 18 promotes free movement of catching layers 18 and additionally absorbs kinetic energy. As a result, breach of the structure may be avoided by relying on a mechanism instead of or in addition to load distribution in the methods and apparatuses herein.

A variety of self-sealing fuel bladders are known. They operate according to various mechanisms whereby exposure of fibers and/or plies sets in motion physical changes to a ruptured area, reducing fuel loss. In the example of FIG. 1C, partial delamination of catching layers 18 could allow migration of liquid, such as fuel, into the delamination, setting in motion the mechanisms that self-seal the fuel bladder, such as swelling, foaming, etc. of the delaminated fibers and/or plies.

Figure 2A:
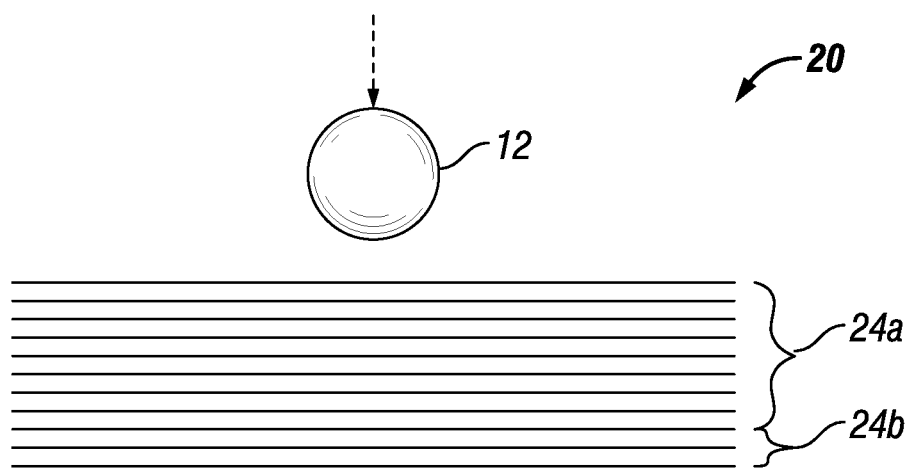
FIGS. 2A, 2B, and 2C show sequential, cross-sectional side views of an object impacting a reinforced composite, causing micro-delaminations, and stopping in a backside catch layer.
Figure 2B:
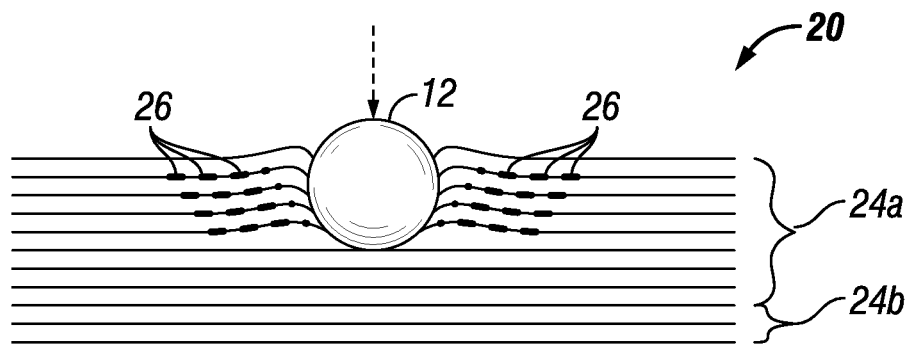
Figure 2C:
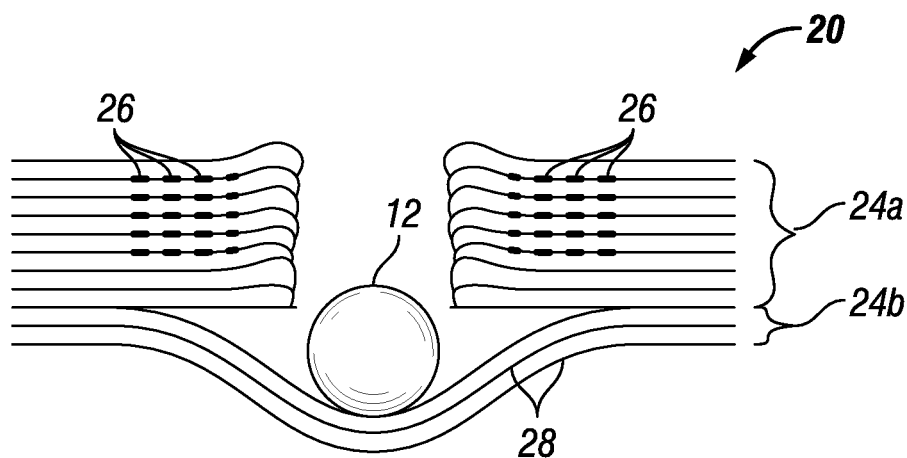

FIGS. 2A-2C explain a measure that may be used alone or in conjunction with the catching layer concept of FIGS. 1A-1C. FIGS. 2A-2C show the measure used in conjunction with the catching layer concept. In FIG. 2A, a composite 20 includes layers 24a/24b, which may be individual plies or groups of plies, about to be impacted by object 12. Composite 20 includes frontside layers 24a separated from backside layers 24b. The region of reduced adhesion 16 in FIGS. 1A-1C may be included in composite 20 to separate frontside layers 24a from backside layers 24b. Alternatively, other forms of interface materials discussed herein may be included as a separator to yield catching layers 28.

FIG. 2B shows object 12 impacting frontside layers 24a and traveling through them. In FIG. 2B, the methods and apparatuses described herein for absorbing the kinetic energy from object 12 may be utilized. Micro-delaminations 26 are shown in FIG. 2B beginning to form. Although not apparent from FIG. 2A, interface material between frontside layers 24a is patterned into regions of higher and lower adhesion.

The lower adhesion is sufficiently low that the load applied from the kinetic energy of object 12 exceeds a separation threshold for the lower adhesion regions causing delaminations between the regions of higher adhesion. The micro-delaminations in lower adhesion regions distribute the width of the volume affected by the load applied to frontside layers 24a. The specific location of such lower adhesion regions is not apparent except that micro-delaminations 26 show where the distributed load exceeded a separation threshold sufficient to delaminate some of the lower adhesion regions.

A variety of considerations exist in selecting the size, shape, and levels of adhesion for patterns that vary in the interface materials. In general terms, the varied adhesion can dictate the location and progression of delaminations. By controlling the delaminations (and locations of high adhesion), global deformation of the structure can be controlled. A specific mode may be targeted and a geometric structure variation designed to achieve the global failure mode. Examples include mode I (opening load) fracture toughness (GIC) and mode II (shearing load) fracture toughness (GIIC). The pattern variation may set the interface material characteristics to achieve one mode or the other. Another component of controlling global deformation may include controlling failure geometry. A specific geometry may be targeted and patterns that vary in the interface materials may be designed to achieve the failure geometry. One example includes an object impact that is expected to produce failure by symmetric deformation centered on the impact, but is altered by design to an asymmetric deformation, such as an elliptical deformation or deformation with more deformation to one side of the impacting object.

In the event that the load distribution from micro-delaminations 26 is insufficient to stop object 12, FIG. 2C shows backside layers 24b becoming catching layers 28. As indicated above, the release properties associated with backside layers 24b also enables various energy absorption mechanisms, such as those described for catching layers 18.

The designated patterns in composite 10 and 20 may measurably vary adhesion, toughness, strength, modulus, or combinations thereof through the thickness so that layers fail progressively. As object 12 passes through successive layers, failure of each layer absorbs kinetic energy additional to the other absorption mechanisms described. Accordingly, after delaminating from contact with frontside layers 14a or 24a, one or more plies in catching layers 18 or 28 may fail progressively. One or more other plies may remain to avoid breach of the structure. In this manner, layers 14b or 24b absorb additional kinetic energy after becoming catching layers 18 or 28.

As also mentioned above, concepts used for self-sealing fuel bladders may be incorporated into composite 20. Since self-sealing fuel bladders often operate on the assumption that fibers will fail and layers will be delaminated, increasing the distribution of the damage mechanism, as in micro-delaminations 26, may initiate a more significant response in the known self-sealing mechanisms. Delamination may allow fluid, such as fuel, ingress into layers 24a and cause the reaction or physical response in a self-sealing mechanism. Similarly, such delamination may accentuate, release, or mix chemical species to cause foaming and/or local expansion and cure with the purpose of plugging breaches in composite 20. Examples of known self-sealing mechanisms that may benefit from the additional methods and apparatuses described herein are disclosed in US Patent Application Publication Nos. 2016/0347038 by Childress et al., 2017/0057345 by Wilenski et al., 2017/0057344 by Kozar et al., 2017/0057342 by Kozar et al., and 2017/0057341 by Wilenski et al., all of which include the present inventors among the named inventors.

Figure 3:
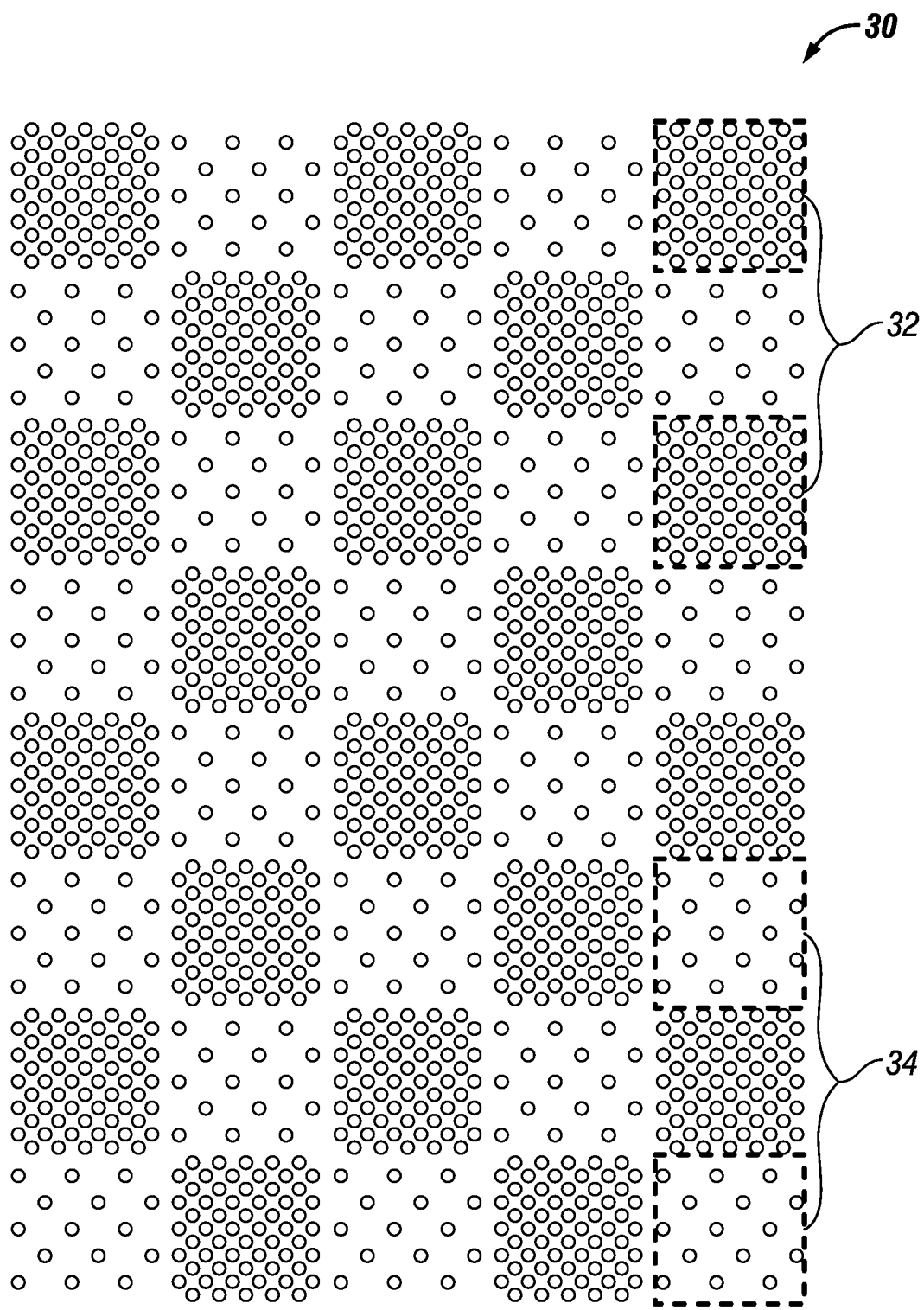
FIG. 3 shows a top view of an interface material geometric structure.

FIG. 3 shows a top view of an interface material geometric structure providing in-plane variation of properties, such as adhesion, toughness, strength, modulus, or combinations thereof. The geometric structure could be printed using known methods and apparatuses, or applied by another known technique. A pattern 30 in FIG. 3 contains regions of higher density 32 and regions of lower density 34. Disks of interface material within higher density regions 32 are distributed to yield a desired coverage area while the interface material disks in lower density regions 34 have a coverage area lower than the coverage area of regions 32. The interface material disks could contain an adhering species or, alternatively, a releasing species. For adhering species, higher density regions 32 would exhibit a higher level of adhesion compared to lower density regions 34. For releasing species, higher density regions 32 would exhibit a lower level of adhesion compared to lower density regions 34.

Figure 4:
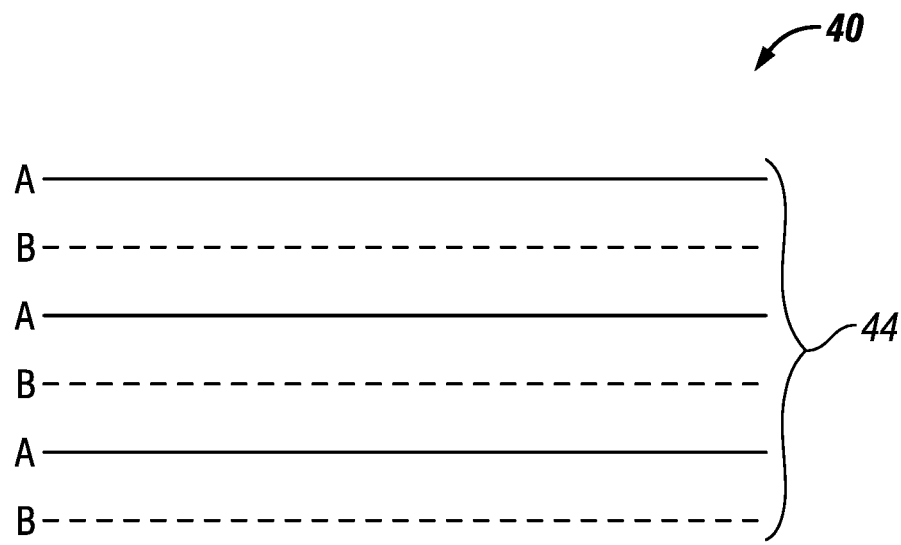
FIGS. 4 and 5 show cross-sectional side views of two examples of spatial variation among layers of interface material.
Figure 5:
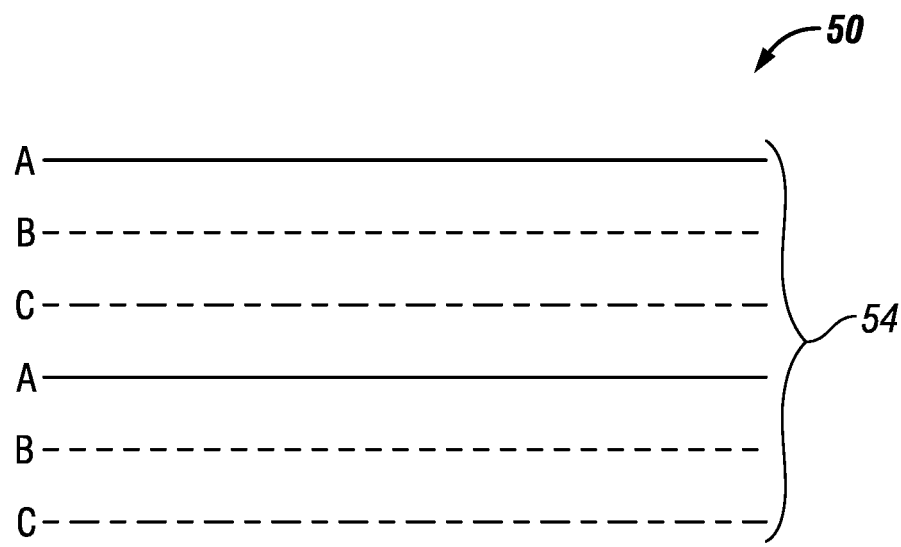

Instead of property variations in-plane, the adhesion, toughness, strength, modulus, or combinations thereof may vary through-thickness, as shown in FIGS. 4 and 5. In FIG. 4, a composite 40 includes layers 44 that alternate between A-type and B-type. The dashed lines of the B-type of layers 44 are not intended necessarily to indicate intermittent coverage of interface material. Instead, the dashed lines merely identify a different type of interface material. Intermittent coverage is one way to provide differing types of interface material. In the cross-sectional side view of one example of spatial variation, FIG. 4 could provide the A-type of layers 44 with a higher adhesion level compared to the B-type of layers 44, such that the B-type layers preferentially delaminate.

In the through-thickness region shown in FIG. 4, properties may vary in the through-thickness direction. Additionally, by incorporating the concepts of FIG. 3, other through-thickness regions of composite 40 not visible in FIG. 4 could be provided that do not vary in the through-thickness region of layers 44 or that vary differently than shown in FIG. 4. In other words, a pattern could be provided in the through-thickness region as well as in-plane. In such manner, the B-type of layers 44 could be replaced with the A-type of layers 44 in other through-thickness regions not shown in FIG. 4.

FIG. 5 shows another cross-sectional side view of another example of spatial variation among layers of interface material. Instead of an ABAB variation, FIG. 5 shows an ABCABC variation by adding a C-type of interface material among layers 54. Again, the dashed line of C-type layers 54 merely shows a different type of interface material, not an interface material of necessarily different coverage area, although that is one type of possible variation. Other conceivable variations include an AABBAABB pattern, an ABCCBAABCCBA pattern, etc.

The different inter-ply adhesion levels of FIGS. 4 and 5 provide another mechanism for controlling performance of reinforced composite materials in keeping with the methods and apparatuses described herein. In FIGS. 4 and 5, the plies themselves are not apparent, but layers 44 and 54 of interface material are understood to be positioned between plies of composites 40 and 50.

The examples of FIGS. 1A-1C, 2A-2C, and 3-5 provide a few possibilities for patterning an adhesive, a coupling agent, a release agent, or some other interface material effective to control the failure mode between layers of plies or between individual plies themselves. However, additional possibilities for achieving a desired failure mode are conceivable when taking into account the following additional considerations.

A few non-exclusive examples of desired failure modes include a) controlling the amount of energy absorbed during release of a layer, b) controlling the amount of energy absorbed specifically through delamination of layers, c) controlling the amount of energy absorbed by the type of delamination, such as micro-delaminations, and d) controlling the amount of energy absorbed by release of backside layers into a catch layer. Interrelated properties of interface material that influence achieving the enumerated failure modes and other failure modes include material property variation, geometric structure variation, spatial variation, and combinations thereof.

Material property variation may be variation in an adhesive, coupling agent, or release agent. Properties may vary by material composition so that providing different compositions of interface material in-plane or through-thickness yields the desired variation. For some materials, the manufacturing method may also influence properties such as adhesion, toughness, strength, and modulus although the material has the same composition. In addition, different categories of interface material may be used in-plane or through-thickness, such as, alternating adhesive and release agent. Consequently, although complete coverage of an interface material may exist between layers, material properties may vary in-plane or through-thickness.

On a similar note, even though a same category of interface material may be used uniformly in-plane or through-thickness, geometric structure variation may introduce regions that perform differently to provide the desired control of failure modes. It is conceivable that geometric structure variation may be used to create a pattern of regions with controlled mechanical properties, such as, adhesion/release, energy absorption, delamination area, and delamination pattern/direction. In geometric structure variation, generally speaking, the presence or absence of a given interface material determines the properties. Material property variation may be combined with geometric structure variation so that different interface materials are distributed among a pattern of geometric structure. Patterns may use a variety of geometric forms, such as squares, circles, ellipses, triangles, stars, rectangles, lines, squiggles, random patterns, and combinations thereof.

Interface material films, such as non-woven films, are amenable to production with patterns of geometric structure variation formed therein. One simple example includes lines of adhesive spaced apart in-plane to yield a desired effect. Material property variation may be introduced by including two-types of adhesive, A and B in a repeating pattern. Width of lines may be additionally varied to introduce a second geometric structure variation. In the example of lines of adhesive, spaces between lines need not be present when multiple types of interface material are included in the interface material. The variations discussed above for FIGS. 4 and 5 of ABAB, ABCABC, AABBAABB, ABCCBAABCCBA, etc. may be implemented in-plane with different film types and/or spaces. Geometric structure variation may be discussed in the context of the percentage of an area covered by interface material. Additionally, it is expected that different geometric forms used in geometric structure variation may influence failure modes even for interface materials of the same coverage area.

Spatial variation may occur between layers of a structure at specific locations in the through-thickness direction and/or over the in-plane direction to provide the ability to tailor the location of specific energy absorption and/or failure modes spatially throughout an article. Certain parts of an article serve certain purposes and spatial variation allows varying a pattern to match features of select locations on a specific article, such as having high adhesion near article edges. One example of spatial variation is described above with regard to FIGS. 1C and 2C.

Fabrication considerations allow a variety of methods for making the apparatuses described herein. Advances in material printing technology enable the material property variation, geometric structure variation, and spatial variation described herein. Material printing technology enables a wide variety of printed pattern options for interface material compatible with material printing. One benefit of the material property variation, geometric structure variation, and spatial variation includes ease of implementation prior to matrix impregnation ("prepregging") or during panel layup.

Patterned toughener film, release film, veil, or other interface material may be applied during fabrication and/or prepregging. Veils are normally used to enhance surface appearance and/or duration by masking the reinforcing fiber pattern. However, herein, veils may be used as interface material. As interface materials, veils may be made with material property variations (different fibers, different adhesives, multiple fibers, different adhesives in patterns, etc). Veils may include geometric structure variations, such as, holes in different patterns, different percentages of coverage, different shapes, etc. Veils may include spatial variation, such as, the thickness of the veil (locally thick regions, locally thin regions, etc). The amount of adhesion between the fibers of the veils may vary spatially. The fibers in the veil may be oriented either globally or locally.

Features may be printed directly on layers used to compose an article. The variations may be introduced in-line during fabrication of a part, during fabrication of a film, or during fabrication of prepreg articles. Alternatives to material printing include spraying through a mask and placing a patterned film or other non-woven interface material in the structure. The film or non-woven interface material could have holes in it or selected regions with properties different from other regions. Simply placing the film or non-woven interface material then introduces the variation.

According to one embodiment, a kinetic energy absorption method includes providing a reinforced composite article including a first ply, a second ply other than the first ply, and a third ply other than the first and second plies. A first interface material is between the first ply and the second ply. A second interface material is between the second ply and the third ply. A designated pattern of material property variation, geometric structure variation, spatial variation, or combinations thereof is distributed to selected locations identified in the first interface material or distributed between selected locations identified in the first interface material compared to the second interface material. The pattern is sufficient to measurably vary adhesion, toughness, strength, modulus, or combinations thereof. A matrix material at least partially encapsulates the first, second, and third plies. The method additionally includes distributing a load across the pattern when the first, second, and third plies receive a force from kinetic energy above a separation threshold by partially delaminating the first ply from the second ply, the second ply from the third ply, or both.

In the context of the present document, "adhesion" refers to a widely-known property describing the tendency of surfaces to cling to one another. Also, "toughness" refers to a widely-known property wherein a material absorbs energy without fracturing, even though it may plastically deform. In some systems, toughness may be quantified as the total area under the stress-strain curve. Further, "strength" refers to the ability of a material to avoid failure while withstanding an applied stress. In some systems, strength may be quantified as the ultimate tensile strength, meaning the maximum engineering (i.e., nominal) stress of the stress-strain curve. Still further, "modulus" (i.e., "elastic modulus") describes the ability of a material to resist elastic deformation. In some systems, modulus may be quantified as the slope of the stress-strain curve in the elastic region. Adhesion, toughness, strength, and modulus may be measured by a variety of techniques known to those of ordinary skill.

Additional features may be implemented in the present method. By way of example, the article may be an aircraft fuel bladder. The first interface material may contact both the first ply and the second ply. The second interface material may contact both the second ply and the third ply. The composite article may be fiber-reinforced and the first, second, and third plies may be plies of fibers. Or, the composite article may be film-reinforced and the first, second, and third plies may be plies of film. The first and second interface materials may independently contain a material selected from among an adhesive, a coupling agent, a release agent, a polymer film, an adhesive film, a toughener film, a release film, a veil, or combinations thereof. The adhesive film, the toughener film, and the release film may be non-woven films.

The pattern may include a geometric structure selected from among squares, circles, ellipses, triangles, stars, rectangles, lines, squiggles, random patterns, and combinations thereof. The first interface material may contain a pattern of multiple first regions of interface material disks, wherein each of the multiple first regions has a coverage area. The first interface material may also include a pattern of multiple second regions of interface material disks, wherein each of the multiple second regions has a coverage area lower than the coverage area of the first regions.

In the present method, the pattern may be a first pattern and the article may further include a designated second pattern of material property variation, geometric structure variation, spatial variation, or combinations thereof distributed to selected locations identified in the second interface material. The second pattern may be sufficient to measurably vary adhesion, toughness, strength, modulus, or combinations thereof to a different degree than the first pattern. Accordingly, the method may further include distributing the load across the first and second patterns by partially delaminating the first ply from the second ply and the second ply from the third ply.

Also, in the present method, the composite article may further include a fourth ply other than the first, second, and third plies, a third interface material between the third ply and the fourth ply, a designated third pattern of material property variation, geometric structure variation, spatial variation, or combinations thereof distributed to selected locations identified in the third interface material. The third pattern may be sufficient to measurably vary adhesion, toughness, strength, modulus, or combinations thereof to a different degree than the second patterns. As a result, the method may further include distributing the load across the first, second, and third patterns by additionally partially delaminating the third ply from the fourth ply.

In reference to the present method, the third ply may be a backside ply, another designated pattern may be distributed in the second interface material, the second interface material may be a release material, and the second interface material may contact both the second ply and the third ply. It follows then that the distribution of the load may further include applying the load with an object having kinetic energy, catching the object with the third ply after it passes through the first ply, and partially delaminating the third ply from the second ply.

Alternatively, the second and third plies may be backside plies, the first interface material may be a release material, and the first interface material may contact both the first ply and the second ply. Another designated pattern may be distributed in the second interface material, the second interface material may be a shearing material, and the second interface material may contact both the second ply and the third ply. Consequently, the distribution of the load may further include applying the load with an object having kinetic energy and catching the object with the second and third plies after it passes through the first ply. The second ply may be partially delaminated from first ply. The method includes promoting free movement between the second and third plies by shearing the second interface material.

The additional features that may be implemented in the present method may also be implemented in other embodiments herein.

In another embodiment, a kinetic energy absorptive, reinforced, composite article contains a first ply, a second ply other than the first ply, and a third ply other than the first and second plies. A first interface material is between the first ply and the second ply. A second interface material is between the second ply and the third ply. The article includes a designated pattern of material property variation, geometric structure variation, spatial variation, or combinations thereof distributed to selected locations identified in the first interface material or distributed between selected locations identified in the first interface material compared to the second interface material. The pattern is sufficient to measurably vary adhesion, toughness, strength, modulus, or combinations thereof. A matrix material at least partially encapsulates the first, second, and third plies.

Additional features may be implemented in the present article. By way of example, the article may be an aircraft fuel bladder. The first interface material may contact both the first ply and the second ply. The second interface material may contact both the second ply and the third ply. The composite article may be fiber-reinforced and the first, second, and third plies may be plies of fibers. Or, the composite article may be film-reinforced and the first, second, and third plies may be plies of film. The first and second interface materials may independently contain a material selected from among an adhesive, a coupling agent, a release agent, a polymer film, an adhesive film, a toughener film, a release film, a veil, and combinations thereof. The adhesive film, the toughener film, and the release film may be non-woven films. The pattern may include a geometric structure selected from among squares, circles, ellipses, triangles, stars, rectangles, lines, squiggles, random patterns, and combinations thereof.

The first interface material may contain a pattern of multiple first regions of interface material disks, wherein each of the multiple first regions have a coverage area. The first interface material may also include a pattern of multiple second regions of interface material disks, wherein each of the multiple second regions have a coverage area lower than the coverage area of the first regions.

The pattern may be a first pattern and the article may further contain a designated second pattern of material property variation, geometric structure variation, spatial variation, or combinations thereof distributed to selected locations identified in the second interface material. The second pattern may be sufficient to measurably vary adhesion, toughness, strength, modulus, or combinations thereof to a different degree than the first pattern.

The composite article may further contain a fourth ply other than the first, second, and third plies, and a third interface material between the third ply and the fourth ply. The article may further include a designated third pattern of material property variation, geometric structure variation, spatial variation, or combinations thereof distributed to selected locations identified in the third interface material. The third pattern may be sufficient to measurably vary adhesion, toughness, strength, modulus, or combinations thereof to a different degree than the first and second patterns.

In reference to the present article, the third ply may be a backside ply, another designated pattern may be distributed in the second interface material, the second interface material may be a release material, and the second interface material may contact both the second ply and the third ply.

Alternatively, the second and third plies may be backside plies, the first interface material may be a release material, and the first interface material may contact both the first ply and the second ply. Another designated pattern may be distributed in the second interface material, the second interface material may be a shearing material, and the second interface material may contact both the second ply and the third ply.

The additional features that may be implemented in the present article may also be implemented in other embodiments herein.

In a further embodiment, a kinetic energy absorptive, reinforced, composite article includes an interior ply, a first backside ply other than the interior ply, and a second backside ply other than the interior ply and the first backside ply. A release material is between and in contact with the interior ply and the first backside ply. A shearing material is between and in contact with the first backside ply and the second backside ply. The article includes a designated first pattern of material property variation, geometric structure variation, spatial variation, or combinations thereof distributed to selected locations identified in the release material. The first pattern is sufficient to measurably vary adhesion, toughness, strength, modulus, or combinations thereof. The article includes a designated second pattern of material property variation, geometric structure variation, spatial variation, or combinations thereof distributed to selected locations identified in the shearing material. The second pattern is sufficient to measurably vary adhesion, toughness, strength, modulus, or combinations thereof to a different degree than the first pattern. A matrix material at least partially encapsulates the interior ply, the first backside ply, and the second backside ply.

Additional features may be implemented in the present article. By way of example, the composite article may be fiber-reinforced and the first, second, and third plies may be plies of fibers. Or, the composite article may be film-reinforced and the first, second, and third plies may be plies of film. The additional features that may be implemented in the present article may also be implemented in other embodiments herein.

The inventors expressly contemplate that the various options described herein for individual methods and apparatuses are not intended to be so limited except where incompatible. The features and benefits of individual methods herein may also be used in combination with apparatuses and other methods described herein even though not specifically indicated elsewhere. Similarly, the features and benefits of individual apparatuses herein may also be used in combination with methods and other apparatuses described herein even though not specifically indicated elsewhere.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A kinetic energy absorptive, reinforced, composite article, comprising:
   a first ply, a second ply other than the first ply, and a third ply other than the first ply and the second ply;
   a first interface layer between the first ply and the second ply, wherein the first interface layer has a first adhesion level, wherein the first interface layer comprises an in-plane pattern of disks of interface material, wherein the in-plane pattern comprises a first set of areas and a second set of areas, wherein the disks of interface material within the first set of areas are distributed at a first density, wherein the disks of interface material within the second set of areas are distributed at a second density, and wherein the first set of areas and the second set of areas, combined, result in the first adhesion level;
   a second interface layer between the second ply and the third ply, the second interface layer having a second adhesion level that is different than the first adhesion level; and
   a matrix material at least partially encapsulating the first ply, the second ply, and the third ply.

2. The kinetic energy absorptive, reinforced, article of claim 1, wherein the article is an aircraft fuel bladder.

3. The article of claim 1, wherein:
   the first interface layer contacts both the first ply and the second ply, and
   the second interface layer contacts both the second ply and the third ply.

4. The kinetic energy absorptive, reinforced, article of claim 1, wherein:
   the kinetic energy absorptive, reinforced, composite article is fiber-reinforced and the first ply, the second ply, and the third ply are plies of fibers, or the kinetic energy absorptive, reinforced, composite article is film-reinforced and the first ply, the second ply, and the third ply are plies of film; and the first interface layer and the second interface layer independently comprise a material selected from among an adhesive, a coupling agent, a release agent, a polymer film, a non-woven adhesive film, a non-woven toughener film, a non-woven release film, a veil, and combinations thereof.

5. The kinetic energy absorptive, reinforced, article of claim 1, wherein the in-plane pattern comprises a geometric shape selected from squares, circles, ellipses, triangles, stars, rectangles, lines, squiggles, random patterns, and combinations thereof.

6. The kinetic energy absorptive, reinforced, article of claim 1, wherein:
the disks of interface material comprise a release agent, and
the second density is lower than the first density.

7. The kinetic energy absorptive, reinforced, article of claim 1, wherein:
the second interface layer comprises a second in-plane pattern of disks of interface material,
the second in-plane pattern comprises a third set of areas and a fourth set of areas,
the disks of interface material within the third set of areas are distributed at a third density,
the disks of interface material within the fourth set of areas are distributed at a fourth density, and
the third set of areas and the fourth set of areas, combined, result in the second adhesion level.

8. The kinetic energy absorptive, reinforced, article of claim 7, wherein the kinetic energy absorptive, reinforced, composite article further comprises:
a fourth ply other than the first ply, the second ply, and the third ply; and
a third interface layer between the third ply and the fourth ply, the third interface layer having a third adhesion level that is different than the first and second adhesion levels.

9. The kinetic energy absorptive, reinforced, article of claim 1, wherein:
the third ply is a backside ply, and
the second adhesion level is less than the first adhesion level.

10. The kinetic energy absorptive, reinforced, article of claim 1, wherein:
the second ply and the third ply are backside plies, and
the second interface layer comprises a shearing material.

11. A kinetic energy absorptive, reinforced, composite article comprising:
an interior ply, a first backside ply other than the interior ply, and a second backside ply other than the interior ply and the first backside ply;
a first interface layer between and in contact with the interior ply and the first backside ply, wherein the first interface layer comprises an in-plane pattern of disks of release material, wherein the in-plane pattern comprises a first set of areas and a second set of areas, wherein the disks of release material within the first set of areas are distributed at a first density, wherein the disks of release material within the second set of areas are distributed at a second density, and wherein the first set of areas and the second set of areas, combined, result in a first adhesion level;
a shearing layer between and in contact with the first backside ply and the second backside ply; and a matrix material at least partially encapsulating the interior ply, the first backside ply, and the second backside ply.

12. A kinetic energy absorption method, comprising steps of:
receiving, at the kinetic energy absorptive, reinforced, composite article of claim 1, a force from an object having kinetic energy above a separation threshold; and
distributing a load, associated with the force, across the first ply, the second ply, and the third ply by partially delaminating the first ply from the second ply, the second ply from the third ply, or both.

13. The method of claim 12, wherein the first interface layer contacts both the first ply and the second ply and the second interface layer contacts both the second ply and the third ply.

14. The method of claim 12, wherein:
the kinetic energy absorptive, reinforced, composite article is fiber-reinforced and the first ply, the second ply, and the third ply are plies of fibers, or the kinetic energy absorptive, reinforced, composite article is film-reinforced and the first ply, the second ply, and third ply are plies of film; and
the first interface layer and the second interface layer independently comprise a material, selected from among an adhesive, a coupling agent, a release agent, a polymer film, an adhesive film, a toughener film, a release film, a veil, or combinations thereof.

15. The method of claim 12, wherein the in-plane pattern of the disks of interface material comprises a geometric shape, selected from among squares, circles, ellipses, triangles, stars, rectangles, lines, squiggles, random patterns, and combinations thereof.

16. The method of claim 12, wherein the disks of interface material comprise a release agent, and wherein the second density is lower than the first density.

17. The method of claim 12, further comprising distributing the load across the first ply, the second ply, and the third ply by partially delaminating the first ply from the second ply and the second ply from the third ply, wherein:
the second interface layer comprises a second in-plane pattern of disks of interface material,
the second in-plane pattern comprises a third set of areas and a fourth set of areas,
the disks of interface material within the third set of areas are distributed at a third density, and
the disks of interface material within the fourth set of areas are distributed at a fourth density.

18. The method of claim 17, wherein:
the kinetic energy absorptive, reinforced, composite article further comprises:
a fourth ply other than the first ply, the second ply, and the third ply; and
a third interface layer between the third ply and the fourth ply;
the third interface layer comprises a third in-plane pattern of disks of interface material;
the third in-plane pattern comprises a fifth set of areas and a sixth set of areas;
the disks of interface material within the fifth set of areas are distributed at a fifth density;
the disks of interface material within the sixth set of areas are distributed at a sixth density;
the fifth set of areas and the sixth set of areas, combined, result in a third adhesion level; and the method further comprises distributing the load across the first ply, the second ply, the third ply, and the fourth ply by additionally partially delaminating the third ply from the fourth ply.

19. The method of claim 12, wherein the third ply is a backside ply, and the step of distributing the load, associated with the force across the first ply, the second ply, and the third ply, comprises:
   catching the object at the third ply; and
   partially delaminating the third ply from the second ply.

20. The method of claim 12, wherein the second ply and the third ply are backside plies, and the step of distributing the load, associated with the force across the first ply, the second ply, and the third ply, comprises:
   catching the object with the second ply and the third ply;
   partially delaminating the second ply from the first ply; and
   promoting free movement between the second ply and the third ply by shearing the second interface layer.

* * * * *